Aug. 3, 1937.   S. LYONS   2,088,966
COFFEE MAKING APPARATUS AND METHOD
Filed Feb. 20, 1933
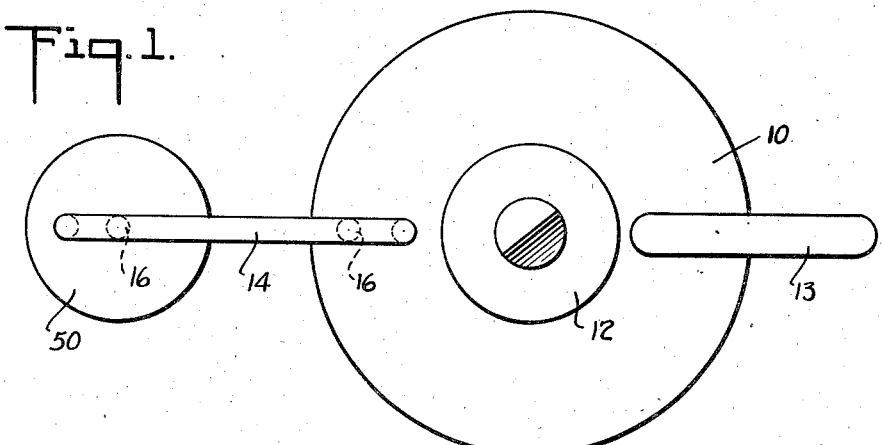
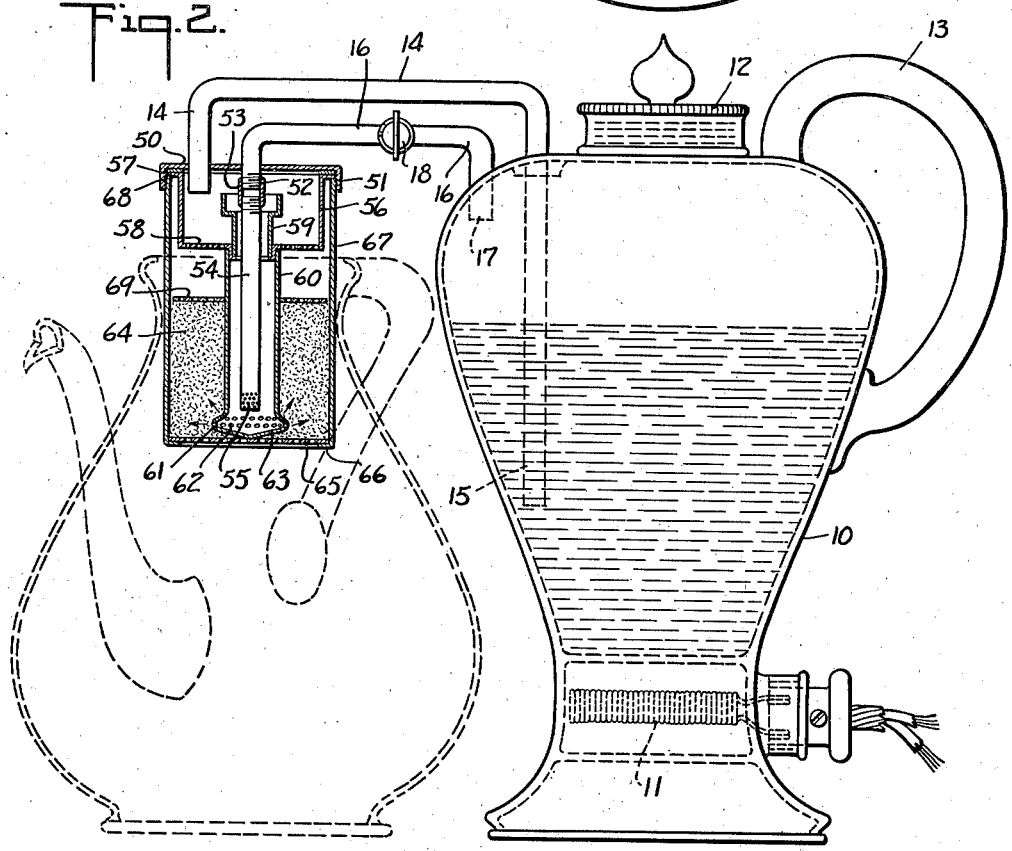
INVENTOR
Samuel Lyons
BY
ATTORNEY Patented Aug. 3, 1937

2,088,966

UNITED STATES PATENT OFFICE 2,088,966

COFFEE MAKING APPARATUS AND METHOD

Samuel Lyons, Brooklyn, N. Y.

Application February 20, 1933, Serial No. 657,514

3 Claims. (Cl. 53—3)

The present invention relates to coffee making apparatus and methods.

The present invention contemplates an improved method of making coffee, according to which grindings to be extracted are first subjected to steam at atmospheric pressure to soften the same and then the material to be extracted is subjected to boiling hot water and steam concurrently, so that the previously heated and moistened material is thoroughly extracted at a single pass of extracting liquid. After the extraction has been completed, steam is passed through the spent grindings to dry the same.

The present invention also contemplates a convenient form of apparatus for making infusions of coffee. The steam and boiling water are preferably made in a closed vessel or boiler having a steam pipe and a water pipe, the latter being submerged below the water level so that accumulated steam pressure in the boiler may force the water out through the water pipe.

According to the present invention the steam is carried through a steam passage of restricted capacity, either in the form of a constriction in the steam pipe or in the form of a non-closable valve. The steam alone, or steam and hot water, are conducted to the grindings chamber or container and the liquid is allowed to drain away from the grindings container into a receptacle.

The present invention also contemplates a method of making coffee and apparatus for coffee making, wherein the essence is completely extracted at a single pass of the water so that the highest quality of coffee extract can be made. The method employed makes it possible to obtain the full strength of the coffee and avoids extracting the bitter element which renders the extract less palatable.

A further object of the invention is to provide coffee making apparatus adapted for making coffee according to the drip process or for making it according to the filtering process in which the coffee grindings are agitated.

Other and further objects of the invention will appear as the description proceeds.

The accompanying drawing shows, for purposes of illustrating the present invention, one of the many embodiments in which the invention may take form, it being understood that the drawing is illustrative of the invention rather than limiting the same.

In this drawing:

Figure 1 is a side elevational view of one form of apparatus adapted for carrying out the present method of coffee making; and Figure 2 is a top plan view of the structure shown in Figure 1.

In the form of construction shown in the drawing the boiler is indicated at 10. This boiler may be in the form of a metal or glass vessel provided with an electric heater 11 and a removable screw cap or cover 12. A handle is indicated at 13 to facilitate lifting or carrying the boiler. A water pipe is indicated at 14. The lower end 15 of this pipe is submerged below the liquid in the boiler 10. The steam pipe 16 passes out through the upper part of the boiler and opens into the steam space as indicated at 17. This steam pipe carries a valve 18, preferably of a non-closable type, so that at all times there is an opening to permit steam to escape.

The steam pipe is brazed or otherwise secured to a cap 50 having a depending, internally threaded flange 51. The lower end 52 of the pipe 16 is threaded to receive a coupling 53 and this coupling supports a short length of pipe 54 closed at the bottom and having perforations 55 adjacent the bottom. The discharge from the water pipe 14 is adapted to be received in a container 56, outwardly flanged as indicated at 57, and perforated as indicated at 58. A stand pipe 59 is secured to the water container 56 surrounds the pipe 54 and extends nearly to the cover 50. A water conduit 60 is detachably carried by the stamping forming the water chamber 56. Any suitable mode of attachment may be employed, such as a pin and bayonet slot. The lower end of this water conduit 60 is bulged, as indicated at 61. The upper part of this bulged portion is provided with holes 62 and the lower part is rounded or tapered as indicated at 63. The grindings are indicated at 64. They rest on a perforated disc 65 adapted to be held in an inwardly drawn flange 66 of a receptacle 67. The upper end of this receptacle is threaded as indicated at 68 to fit the threads 51. The parts 65 and 67 may be made integral if desired, and may take various shapes. A free screen 69 surrounds the water conduit 60 and is adapted to rest on top of the grindings.

When one desires to make coffee a measured amount of coffee grindings is placed in the cup and the parts assembled as shown. These grindings may be pulverized coffee, steel cut coffee, or any other suitable form of ground or pulverized coffee. The measured amount of water is placed in the boiler and the cover 12 secured in place. The water is then brought to a boil.

If one desires to delay the actual making of the coffee, the valve 18 may be turned to wide open position, so that it will transmit all the steam which can be generated by the heater employed, or the heater may be turned down in any convenient manner. This steam will pass through the perforations 55 and holes 62 and the grindings, and will be absorbed by the grindings, so that the grindings may swell and soften. The steam fills the entire chamber but does not extract any coffee essence.

When it is desired to make the coffee extract, the rate of heating may be increased or the valve 18 partially closed. This will cause the pressure of steam to build up in the boiler to such an extent as to force the boiling hot water through the pipe 14, and cause it to pass through the grindings and mix with the steam which continues to pass through the valve. This passage of steam slows up the rate of flow of the water and fills the container with a mixture of water and steam so that the water does not pass through with a sudden rush. When the water comes over, it is received in a receptacle 50 and some of the water drains through the holes 58. In the event that the water comes over too fast for these holes to take care of it, it fills the container and overflows into the pipe 59 and conduit 60, so that one has water and steam discharged underneath the coffee grindings. This agitates the grindings thoroughly and causes a very satisfactory extraction to be made. Owing to the previous softening of the coffee grindings by the steam, a single pass of water will take out all the coffee essence or extract. As soon as the water level of the boiler has been carried below the lower end of the pipe 14, no more water will pass through, but steam will pass through both the pipe 14 and the valve 18, thereby thoroughly drying the grindings and forcing out the last drops of extract.

The extract may be received in a convenient vessel, such as the pitcher shown at 30.

Continued heating of the boiler will cause steam to pass through and maintain an atmosphere of steam above the liquid in the pot 30, so that it is kept hot. It is, of course, necessary to turn off the heat from the boiler before the water has all been boiled away.

When one desires to make French drip coffee, the pipes 54 and 60 may be removed and the water and steam will pass down from the coffee grindings from above without agitation.

It is obvious that the invention may be embodied in many forms and constructions within the scope of the claims, and I wish it to be understood that the particular form shown is but one of the many forms. Various modifications and changes being possible, I do not otherwise limit myself in any way with respect thereto.

What is claimed is:

1. Coffee making apparatus comprising a receptacle having a perforated bottom and adapted to receive coffee grindings, a cover for the top of the receptacle, a steam pipe and a water pipe extending downwardly through the cover, the steam pipe extending down nearly to the bottom of the receptacle and being perforated near its lower end, a water receiver in the upper part of the receptacle and having a perforated bottom to allow water from the water pipe to drain down onto the coffee grindings and a stand pipe about the steam pipe adapted to act as an overflow for water in the receptacle, and a water conduit below the water receiver and about the lower part of the steam pipe to receive water overflowing through the stand pipe, the water conduit having a perforated bottom to direct the water into the grindings from underneath.

2. A coffee making apparatus as claimed in claim 1, wherein the water conduit is removable and the lower part of the steam pipe is separable from the other part, whereby both steam and water may be forced downwardly through the grindings.

3. The method of extracting coffee grindings which consists in first passing steam into the grindings from underneath, then passing water over the grindings and downwardly through them while continuing to pass steam into the grindings from below to agitate them, and then passing water and steam into the grindings from below and drawing the extract away from the grindings.

SAMUEL LYONS.